May 12, 1942.   N. H. ROSBERG   2,282,544
REFRIGERATING APPARATUS AND METHOD OF FREEZING LIQUID FOOD PRODUCTS
Filed Oct. 21, 1940
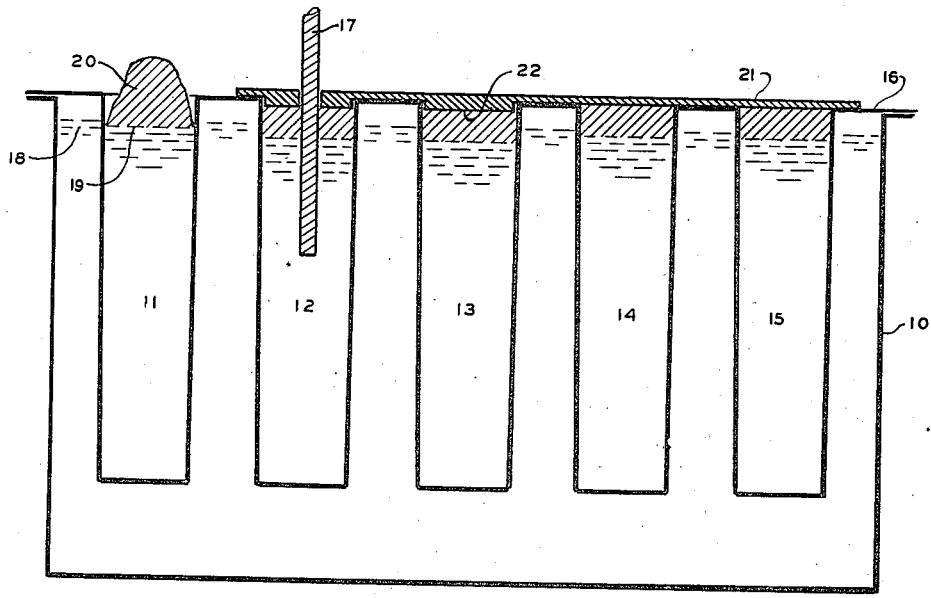
NELS H. ROSBERG
INVENTOR
Paul W. Pregman
ATTORNEY Patented May 12, 1942

2,282,544

UNITED STATES PATENT OFFICE 2,282,544

REFRIGERATING APPARATUS AND METHOD OF FREEZING LIQUID FOOD PRODUCTS

Nels H. Rosberg, Pasadena, Calif., assignor to California Consumers Corporation, Los Angeles, Calif., a corporation of California Application October 21, 1940, Serial No. 362,109

3 Claims. (Cl. 62—114)

In the copending application of Harvey A. Striplin, Serial No. 339,504, a method of preserving various articles of food is described. This method consists broadly in cooking the food, completely immersing it in an aqueous vehicle, freezing the vehicle together with the food, and maintaining the frozen condition until the article is to be served. The method contemplates the freezing of the food in containers or cartons, in cellular cartons which may be broken down to units containing a single serving, and in blocks adapted to be wrapped after freezing and before placing in storage.

In carrying out the last named modification, which is particularly desirable when preparing single portions, a serious difficulty has been encountered in the functioning of the wrapping machines, due to the projection from the upper end of the block of an irregular mass of varying height. In the case of blocks having considerable top surface area this projection, due to expansion of the water content during congelation, is usually gently curved and does not seriously interfere with wrapping, but when single portions of such liquid foods as soups are frozen in the conventional multicell mold, the upper surface is so small that the height of the projection is apt to be at least equal to the thickness of the frozen block. Furthermore these projections are extremely irregular in shape as illustrated by the hatched projection above the left hand cell 11 of the mold shown in the single figure of the drawing, and this irregularity makes it extremely difficult to keep a wrapping machine functioning properly.

I have discovered that this difficulty may entirely be obviated at substantially no cost in the simple manner shown in the attached drawing and hereinafter explained.

Referring to the drawing, 10 is a brine tank; 11, 12, 13, 14, and 15 are freezing cells attached at their upper edges to a plate 16 which rests on the upper edge of the tank. In some cases a rod 17 is inserted part way into the cell to be frozen into the block and aid in lifting it out. Refrigerated brine is circulated through the tank, maintaining a suitable level such as indicated at 18. This is a strictly conventional assembly; a miniature of a type of plant formerly much used in ice making. For the described purpose of freezing single portions of a soup or other liquid food the individual cells may be of dimensions such as ¾ inch by 2 inches by 3 inches deep.

In connection with cell 11 of the drawing is shown what occurs when the top of the cell is left open as is current practice. The cell being initially filled with liquid up to a suitable level, such as indicated at 19, and refrigerated, a layer of ice first forms adjacent the wall of the cell. As this ice occupies some 8.5% more space than the water from which it was formed, the unfrozen liquid core is forced upwardly. As freezing proceeds from the wall toward the center of the cell, the displaced liquid is prevented by its surface tension from overflowing the upper edge of the ice layer already formed. Thus it does not fill completely the original outage space above level 19, but builds up in a humped projection such as is very generally indicated in section by the hatched area 20. The surface of this humped portion is usually rough and irregular, particularly when the liquid contains suspended solids.

I correct this difficulty in the manner illustrated in connection with cells 12 to 15. Cells 14 and 15 are shown as covered by a flat plate 21; in cells 12 and 13 the plate is shown as carrying a downwardly projecting shallow boss 22 which enters the upper end of the cell for only a short distance and is flat on its lower side; in cell 12 the plate is perforated over the center of the cell to allow for the passage of the lifting rod 17. The rod passes freely through this perforation and is not fastened to the plate, but acts as a guide only.

In either case the cell is filled with liquid to such level that the outage (the unfilled space above the liquid level) is approximately equal to the increase in volume of the liquid in freezing (8.55% from and at 32° Fahr.). Refrigeration being applied, the effect above described occurs and continues until the upwardly curved surface of the liquid touches the lower face of the plate. This contact having been made, a meniscus is formed by which the liquid is caused to flow over the upper edge of the ice barrier and thus gradually fill the outage space outside it. This continued conduction of liquid over the ice barrier prevents the latter from increasing in height and, if the original outage space is correctly proportioned to the volume of liquid placed in the cell, this space will be exactly filled when the block is completely frozen and the upper surface of the block will be level and smooth.

The plate 21 should be formed of some smooth-surfaced metal having a high degree of wettability for the liquid to be frozen. The ferrous metals are suitable, particularly such as are non-rusting, such as stainless steel. The thickness of the plate need be only such as will avoid excessive warping in continued use. No material weight is required as the desired effect is due to surface contact rather than to pressure. The plate should be exposed to air at normal temperature, that is to say, it should not be refrigerated in any manner. In a unit having a large number of cells, an individual plate may be used to cover each cell (in which case it is desirable to provide the boss 22 to hold it in position); or a single plate may be used to cover a group of adjacent cells, or even the entire upper area of the cell unit, as may be convenient. It is important that the plate lie flat on the upper edge of each cell.

In either case the blocks are withdrawn from the cells in the well-known manner, by gently warming the cell wall and lifting out the blocks by means of the rods or inverting the cell unit. The plate or plates may then be detached from the upper ends of the blocks in the same manner or, if the plate be sufficiently rigid, the blocks may be knocked away from it.

In this manner small frozen blocks are formed which are strictly rectangular except for the slight taper required for withdrawing the block from the cell, and which are readily handled through any suitable type of wrapping machine.

I claim as my invention:

1. In the freezing of liquid food products in small refrigerated cells, the improvement comprising: partially filling said cells with the liquid to be frozen, to such height that the unfilled space is approximately equal to volumetric expansion of the liquid during congelation, refrigerating the cell while allowing the liquid therein to remain quiescent, and arranging a horizontal metallic surface over said unfilled space to contact unfrozen liquid displaced by said expansion during the progress of congelation.

2. Apparatus for freezing food products in small blocks, comprising: a cell having smooth imperforate walls; means for refrigerating said cell, and an imperforate metallic plate having a smooth lower surface arranged horizontally over the upper end of said cell, said surface resting substantially on the upper edge of said cell.

3. Apparatus for freezing food products in small blocks, comprising: a cell and means for refrigerating said cell, and a plate arranged horizontally over the upper end of said cell and resting substantially on the upper edge thereof, said plate carrying a downwardly directed boss projected into the upper end of said cell and having a smooth and substantially horizontal metallic surface.

NELS H. ROSBERG.